Page …

United States Patent Office 3,842,047
Patented Oct. 15, 1974

3,842,047
HYDROGEN TRANSFER POLYMERIZATION OF 2-PYRROLIDONE WITH ANIONIC CATALYST
Stephen F. Pusztaszeri, P.O. Box 1181,
Port Chester, N.Y. 10573
No Drawing. Continuation-in-part of abandoned application Ser. No. 237,173, Mar. 22, 1972. This application Mar. 22, 1973, Ser. No. 344,036
Int. Cl. C08g 20/18
U.S. Cl. 260—78 P     12 Claims

ABSTRACT OF THE DISCLOSURE

Process for polymerizing 2-pyrrolidone in high yield to produce a high molecular weight polymer having the advantageous physical properties of synthetic polymers, such as strength and wear-resistance, and the advantageous chemical properties of cotton, such as water-absorptivity and release, dye-receptivity and similar ironing capability. The process is a hydrogen transfer which is catalyzed by an anion and bone dry carbon dioxide, nitrogen dioxide or sulphur dioxide gas and pushed to high yield with drying agents. Pure anhydrous 2-pyrrolidone is first reacted with an analytical grade alkali metal or its hydroxide or bicarbonate as an anion source to form a mixture comprising 2-pyrrolidone and the metal salt of 2-pyrrolidone; the mixture is then treated with the bone dry $CO_2$, $NO_2$ or $SO_2$ gas as a catalyst to open the ring of the lactam salt; a drying agent is then added; and finally the hydrogen transfer polymerization is accomplished under controlled heating conditions to produce a high yield of polymer.

CROSS REFERENCE TO RELATED APPLICATION

This application is a continuation-in-part application of Ser. No. 237,173, filed Mar. 22, 1972, now abandoned.

BACKGROUND OF THE INVENTION

There are numerous patents and prior are proposals relating to processes for the anionic polymerization of 2-pyrrolidone using a wide variety of catalysts, activators or initiators. Among the earliest patents are U.S. Pats. 2,638,463; 2,739,959; 2,809,958; 2,891,038 and 2,973,343.

Various activators are mentioned in U.S. Pats. 2,912,415; 3,016,366; 3,022,274; 3,028,369; 3,033,831; 3,040,004; 3,042,659; 3,060,153; 3,061,593; 3,135,719; 3,148,174; 3,158,589; 3,174,951; 3,180,855 and 3,210,324.

The most recent which claim $CO_2$ as the sole polymerization activator are U.S. Pats. 3,681,293; 3,682,869 and 3,683,046 relating to the polymerization of 2-pyrrolidone but either various grades of polymer or industrially unfeasible processes were obtained.

According to these and subseqent patents, the polymerization of 2-pyrrolidone was considered to be an anionic polymerization caused by the rupture of the 2-pyrrolidone ring between the C=O and N—H groups to form a linear polyamide polymer which has come to be known as nylon-4; having the structure:

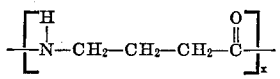

This polymer is melt-spinnable to form fibers having the strength and wear resistance of synthetic fibers and the advantageous chemical properties of cotton, such as water-absorptivity and release, dye-receptivity and similar ironing capability.

Subsequently there have been proposals of hydrogen transfer processes for the polymerization of 2-pyrrolidone also based upon the rupture of the 2-pyrrolidone ring between the C=O and N—H group, as in U.S. Pats. 3,069,392 and 3,383,367.

It is not certain whether such known hydrogen transfer processes are based upon an inaccurate theory, but it is clear that such processes also provide a polymer which is relatively low in yield, are economically not feasible and/or provide a polymer which is modified by the reaction with the activators therewith to become a part of the polymer chain and cause other complications in further processing of the finished polymer.

It is clear that while there are numerous patents relating to a variety of processes proposed over the years for the polymerization of 2-pyrrolidone, such a polymer has never been produced commercially to the best of my knowledge at the present time.

SUMMARY OF THE INVENTION

It is the principal object of the present invention to provide a novel hydrogen transfer process for the polymerization of 2-pyrrolidone, which process is relatively simple and exceptionally efficient, resulting in an actual polymer yield of at least about 90–95% or more based upon the weight of 2-pyrrolidone and its salt subjected to polymerization.

It is another object of this invention to provide a commercially efficient method for the polymerization of 2-pyrrolidone where by pure polyamide polymers of great utility can be produced at the lowest possible cost.

It is still another object to introduce a novel process for polymerizing 2-pyrrolidone in which it can be proved that the 2-pyrrolidone ring is ruptured betwen the number 5 carbon atom and the nitrogen atom.

Single heterocyclic rings are numbered so as to give position "1" to the hetero atom that is most acidic (according to its position in the periodic table), and then numbered around the ring so as to give the other hetero atoms the lowest numbers possible

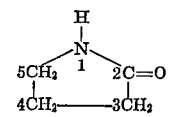

The process of the invention produces a much narrower molecular weight distribution, a longer, stable, linear, novel polyamide polymer which is useful for the commercially available melt-spinning process and having the structure:

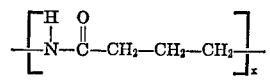

The novel process of the present invention involves three essential steps.

(1) Preparation of the metal salt of 2-pyrrolidone.
(2) Rupture of the heterocyclic ring of the 2-pyrrolidone salt.
(3) Hydrogen transfer polymerization.

DETAILED DESCRIPTION OF PREFERRED EMBODIMENTS

The commercially available 2-pyrrolidone must be purified in known manner or, most preferably, according to the novel and economically most efficient purification process of my co-pending application, Ser. No. 224,274, filed Feb. 7, 1972, using an alkali metal hydroxide reactant.

Step 1

The substantially pure and anhydrous 2-pyrrolidone is reacted with an alkaline reagent which is an alkali metal (Li, Na, K), an alkali metal hydroxide (LiOH, NaOH, KOH) or an alkali metal bicarbonate ($NaHCO_3$, KHCO₃) under very closely controlled conditions. The molar ratio of 2-pyrrolidone to alkaline reagent in the starting mixture should be between 10:1 to 27:1, preferably 13:1.

The reaction temperature should be between 100° and 120° C. under vacuum. The lower temperatures requiring higher vacuum are preferred.

The following reactions take place:

(a) 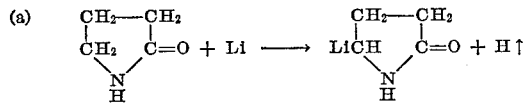

Vigorous agitation and cooling is required. In general this reaction requires the shortest time and the lowest temperature.

(b) 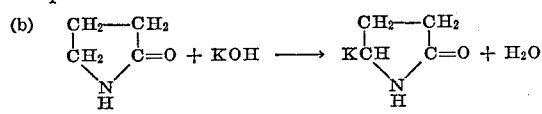

In general this reaction requires moderate time and temperature.

(c) 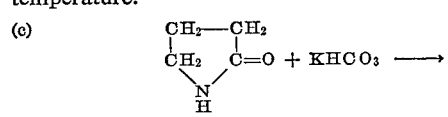

is a two step reaction

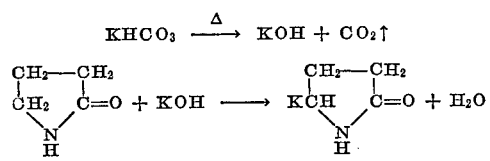

In general to complete this reaction requires the longest time and a much higher temperature.

The most economically feasible way to produce the metal salt of 2-pyrrolidone is to use potassium hydroxide.

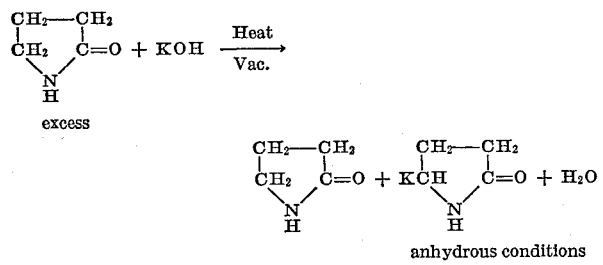

anhydrous conditions

The reaction should preferably be carried out between 100–110° C. and 0.05–20.0 microns mercury pressure. The mole ratio between the 2-pyrrolidone and alkali metal hydroxide is preferably 13:1 or 20:1 parts by weight using KOH in the starting mixture. The preferred molar ratio assures the best results. A lower amount of KOH increases the polymerization time and decreases the conversion. As the amount of KOH is increased, it is not only uneconomical but the additional water (from the KOH) and alkali tend to promote hydrolysis of the 2-pyrrolidone to 4-aminobutyric acid and inhibit polymerization. At the end of the reaction the mole ratio between the 2-pyrrolidone and the 2-pyrrolidone salt is about 11.5:1 or approx. 18:1 parts by weight, about 10% by weight of the system being removed by high vacuum distillation from the system to insure anhydrous conditions which are essential.

TABLE I

The alkali metal, alkali metal hydroxide and alkali metal bicarbonate requirements for efficient 2-pyrrolidone salt preparation, based on 300 g. or 3.53 moles of purified 2-pyrrolidone.

TABLE I

| Compounds | Mol. wt. | Moles | Grams |
|---|---|---|---|
| Li | 6.94 | 0.27 | 1.87 |
| Na | 22.99 | 0.27 | 6.21 |
| K | 39.10 | 0.27 | 10.56 |
| LiOH·H₂O | 41.96 | 0.27 | 11.33 |
| NaOH | 40.00 | 0.27 | 10.80 |
| KOH | 56.11 | 0.27 | 15.15 |
| NaHCO₃ | 84.01 | 0.27 | 22.68 |
| KHCO₃ | 100.10 | 0.27 | 27.03 |

The conditions used for preparing the 2-pyrrolidone salt are very mild. Therefore the metal ion will replace one of the hydrogens attached to the number 5 carbon atom according to the equation:

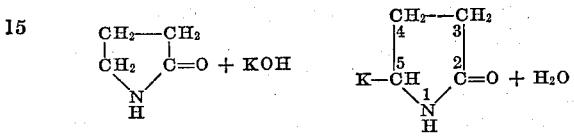

and not replace the hydrogen atom attached to the nitrogen atom as previously supposed.

The following evidence supports the above proposed mechanism:

(a) It has been established by means of the mass spectrograph that the first hydrogen atom loss occurs on the C-5 carbon atom, and that this occurrence puts a charge on the nitrogen atom to provide the ammonium ion, as follows:

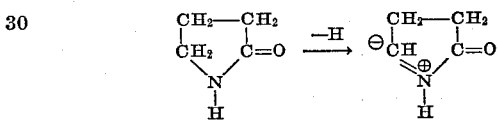

(b) It has also been confirmed by the infra-red spectrophotometer that in the isolated, entirely pure 2-pyrrolidone salt, the metal atom is attached to the number 5 carbon atom rather than to the nitrogen atom.

(c) As further substantiation of the attachment of the metal atom to the number 5 carbon atom of 2-pyrrolidone it has been determined that

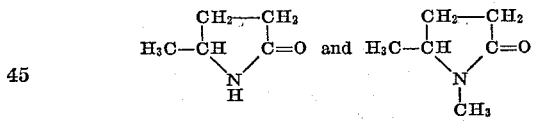

wherein the number 5 carbon atom is substituted, cannot be polymerized. On the other hand even when the nitrogen is substituted, such as in 1-methyl-2-pyrrolidone

wherein the number 5 carbon atom is unsubstituted, this monomer can be polymerized following the regular polymerization process.

I have found that the metal atom will not attach to the nitrogen atom unless concentrated caustic is present in a molar ratio of 1:1 with respect to the 2-pyrrolidone. It is essential to avoid this condition.

The loss of hydrogen from the number 5 carbon atom forms a double bond between the number 5 carbon atom and the nitrogen atom and it is this bond which ruptures during the present polymerization process.

Step 2

The anhydrous 2-pyrrolidone and its salt solution from the previous step which has been cooled down to between 25–45° C. is treated with the activator (economically dry CO₂), dry SO₂, dry NO₂ or other suitable initiator in order to cause the heterocyclic ring of the 2-pyrrolidone salt to rupture.

It is important that the temperature of the solution mixture be maintained above the freezing point of 2-pyrrolidone, preferably between 25 and 35° C., and not exceed about 52° C., to avoid possible formation of short chain polymer. It has not been found possible to obtain good yields at the higher temperatures taught in U.S. Pats. 3,681,293 and 3,682,869 and, in addition, the polymer becomes discolored. Lower temperatures result in a longer reaction time.

The dry gas introduction to the cooled solution mixture causes an exothermic reaction, due to the energy released by rupturing the heterocyclic ring between the number 5 carbon and the nitrogen atom to form a temporary intermediate product having the structure:

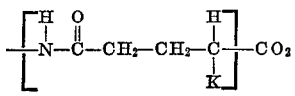

Reactions:

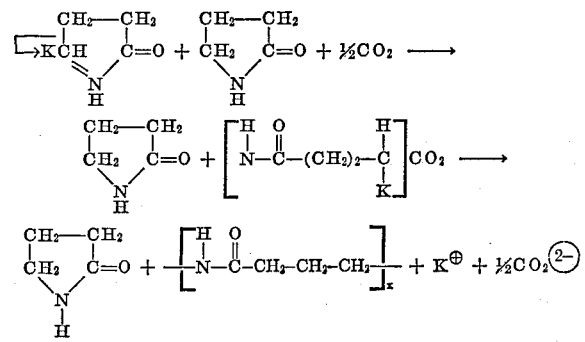

It is a very rapid process and a complex polymeric mixture. The amount of gas added to the reaction mixture is not important providing it is stoichiometrically sufficient to combine with the alkali metal ions present. Its function is to pull out the metal ion from the ring and to provide sufficient energy to split the created weak double bond. Excess gas does no harm but is uneconomical.

If 1 mole of the 2-pyrrolidone salt was formed in the solution mixture, ½ mole of $CO_2$ or $SO_2$ or 1 mole of $NO_2$ and a slight excess amount which will be absorbed by the large excess of anhydrous 2-pyrrolidone is required.

The reaction mixture should be protected from water. The temporary $CO_2$, $SO_2$ or $NO_2$ product is extremely hygroscopic and it breaks down rapidly with water to form the corresponding alkali metal salt or the water will react with the 2-pyrrolidone and form an undesirable amino acid product, as mentioned previously.

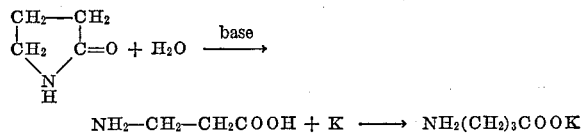

$$NH_2\text{—}CH_2\text{—}CH_2COOH + K \longrightarrow NH_2(CH_2)_3COOK$$

Either form is capable of stopping the polymerization.

After completing the gas addition to the system a drying agent is added to the mixture in order to remove any trace amounts of water present in the solution mixture and/or generated during the subsequent polymerization. The drying agent also stabilizes the viscosity of the solution during polymerization and causes the reaction to proceed more evenly and completely than is the case when the drying agent is omitted. In the absence of a drying agent, polymerization proceeds very rapidly during initial polymerization with an immediate increase in viscosity as short polymer chains are rapidly formed and a substantial amount of unreacted 2-pyrrolidone is trapped within the solidified polymer and remains unpolymerized because the hydrogen transfer process is blocked. Preferred drying agents are the anhydrous alkali metal bicarbonates, carbonates and sulfates ($NaHCO_3$, $KHCO_3$, $Na_2CO_3$, $K_2CO_3$, $Na_2SO_4$ and $K_2SO_4$). The amount of drying agent is based upon the weight of the reaction mixture. The use of about 5% is preferred to insure proper drying, and an excess does not interfere with the polymerization reaction. Other conventional drying agents may also be used provided that they are inert with respect to the reaction mixture. Anhydrous calcium sulfate, calcium and magnesium oxides are satisfactory but are more difficult to wash from the final polymer. Phosphorous pentoxide and chlorides are not suitable because they are reactive with the 2-pyrrolidone at the elevated temperatures used.

Step 3

In the final step of the polymerization process, the reaction mixture which includes the drying agent is subjected to controlled heating in a closed container at a temperature maintained at 48–52° C., preferably 50±½° C. to cause progressive hydrogen transfer polymerization.

Complete polymerization occurs gradually over a period of several hours during which time the molecular weight and viscosity of the reaction mixture increase evenly and gradually as hydrogen transfer progresses.

The polymerization is substantially complete after a period of 48 hours or less and the white solidified polymer is ground and washed to neutral pH with water to remove the drying agent, metal salt formed from the metal ion and gas, and unreacted 2-pyrrolidone, if any.

The washed polymer is dried at 115–120° C. temperature in an electrically controlled oven. The obtained polymer is white, odorless, has a melting point of 262–263° C. and has the following structure:

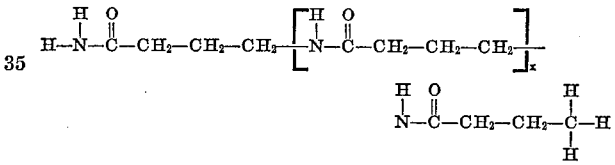

The value of $x$ has not been accurately determined but it is presumed to be in the range of 1500 to 2500.

The following examples are set forth to illustrate the criticality of the amount of alkali metal compound used to react with the pure 2-pyrrolidone monomer in the first step of the present process.

Example 1

300 grams (3.53 moles) of pure, substantially anhydrous 2-pyrrolidone, purified according to the purification process of my afore-mentioned co-pending U.S. application (using potassium hydroxide as reactant), were mixed with 15 grams (0.27 mole) of analytical grade potassium hydroxide (to keep the water content in the KOH constant) in a 3-necked flask. The mixture was heated up slowly under a reduced pressure and in the presence of an inert atmosphere (nitrogen). At 60° C. the potassium hydroxide was dissolved in the 2-pyrrolidone at 30 micron mercury pressure. At 86° C. dehydration began and the vacuum was 30 micron mercury. At 102° C. the 2-pyrrolidone began to distill and the vacuum dropped to 20 micron mercury, evidencing the completion of dehydration. However, this does not insure anhydrous conditions since pyrrolidone hydrate will not release all the bound water under the effects of heat alone. The temperature was raised to 107° C. under 20 micron mercury pressure and approximately 10% of the 2-pyrrolidone was distilled off. At this point sufficient 2-pyrrolidone had been distilled to insure the best anhydrous conditions possible and heating was discontinued and the solution mixture cooled down to 38° C.

Next, bone dry carbon dioxide gas (most economical) was added to the solution in the flask by bubbling the gas into the solution over a 5 minute period. During the $CO_2$ addition, the temperature of the solution increased from 38° C. to 48° C., evidencing the dissociation energy released by the rupture of the 2-pyrrolidone salt ring. The weight gain of the solution was 1.8 grams.

After the $CO_2$ addition, the cloudy, milky solution mixture was poured into a bottle which contained approximately 5%, based upon the weight of the solution, of anhydrous potassium sulfate. The bottle was sealed and put into a constant temperature incubator maintained at $50°\pm\frac{1}{2}°$ C. for 48 hrs. to polymerize.

The white polymer obtained was ground to chips and washed to a neutral pH with water and dried in an electrically heated oven at 105° C. The weight of the pure polymer was 224 grams, equaling a yield of 93.5% based upon the weight of the 2-pyrrolidone and its salt which had been subjected to $CO_2$ treatment. The viscosity of the polymer in solution at room temperature (approx. 25° C.), ½% solution in formic acid, was 8.84 stokes.

Example 2

To illustrate the criticality of the starting ratio of potassium hydroxide to 2-pyrrolidone, the above procedure was repeated exactly except that only 7.5 grams (0.13 mole) of analytical grade potassium hydroxide was used together with 300 grams of the purified 2-pyrrolidone. During the $CO_2$ addition, the temperature of the solution increased from 38° C. up to only 44° C., evidencing less dissociation energy, and after heating for 48 hours at the constant temperature of $50\pm\frac{1}{2}°$ C. in the presence of approx. 5% drying agent, the weight of ground, washed and dried polymer was only 90.6 grams equaling a yield of 37.8% based upon the weight of 2-pyrrolidone and its salt which had been subjected to $CO_2$ treatment. The viscosity of the polymer in 5% formic acid solution at room temperature was 2.75 stokes.

Example 3

In another experiment to show criticality of the alkaline reagent concentration, 150 grams (1.77 moles) of pure 2-pyrrolidone and 5.6 grams (0.1 mole) of analytical grade potassium hydroxide were mixed following the procedure of Example 1. The molar ratio was about 27:1. After reaction the solution mixture was cooled down to 31° C. then the $CO_2$ gas was introduced. During $CO_2$ addition the temperature of the solution increased to 39° C. and the weight gain was 0.7 gram.

After the $CO_2$ addition the solution was divided into two equal portions each of which was poured into a bottle containing approx. 5%, based upon the weight of solution, of anhydrous potassium sulfate. The bottles then were sealed and held at a constant temperature at $50\pm\frac{1}{2}°$ C. to polymerize.

Bottle 1 was polymerized for 48 hrs. 70.2 sol. mixt.
Bottle 2 was polymerized for 96 hrs. 70.1 sol. mixt.

After 48 hrs. bottle 1 yield: 37.8 g. equal to 53.8% conversion viscosity: 5.46 stokes (at room temp. approx. 25° C.) as an 0.5% solution in formic acid.

After 96 hrs. bottle 2 yield: 59.3 g. equal to 84.5% conversion; viscosity: 8.15 stokes (at room temp. approx. 25° C.) as an 0.5% solution in formic acid.

The above results clearly indicate that the polymerization rate is very dependent on the initial concentration of alkaline reagent used. Outside the preferred concentration, the polymerization required a longer time to complete which is economically not feasible for production purposes.

The following experiments were carried out to prove that $CO_2$ is not the sole polymerization activator as supposed in British Pat. 1,267,446 and U.S. Pats. 3,681,293; 3,682,869 and 3,683,046.

Example 4

300 grams (3.53 moles) of pure, anhydrous 2-pyrrolidone were mixed with 15 grams (0.27 mole) of analytical grade potassium hydroxide. The procedure of Example 1 was followed except that the $CO_2$ gas was replaced with dry $NO_2$ (nitrogen dioxide) gas. The gas addition time was 5 min. During the $NO_2$ addition the temperature increased from 30° C. to 44° C. and the weight gain was 1.9 grams. After the $NO_2$ addition, the white, milky solution was divided into two equal parts, and polymerized 48 hrs. at $50\pm\frac{1}{2}°$ C.

4/1 was polymerized without the drying agent.
4/2 was polymerized with the drying agent.

The obtained white polymer in both cases was ground, washed with $H_2O$ and dried. The weight of the polymer was 4/1, 79.4 grams, 56.7% conversion
4/2, 132.0 grams, 94.3% conversion based upon the weight of the 2-pyrrolidone and its salt after $NO_2$ addition subjected to polymerization (140 grams). The obtained viscosity at room temperature (approx. 25° C.) as a 0.5% solution in formic acid was 4/1, 6.41 stokes
4/2, 8.90 stokes.

Example 5

300 grams (3.53 moles) of pure, anhydrous 2-pyrrolidone was mixed with 15 grams (0.27 mole) of analytical grade potassium hydroxide. The procedure of Example 1 was followed except that the $CO_2$ gas was replaced with dry $SO_2$ (sulfur dioxide) gas. The period of gas addition was 5 min. During the $SO_2$ addition the temperature increased from 32° C. to 44° C. and the weight gain was 1.8 grams. After the $SO_2$ addition the white, (no discolorization occurred), milky solution was divided in two equal parts and polymerized 48 hrs. at $50\pm\frac{1}{2}°$ C.

5/1 was polymerized with the drying agent.
5/2 was polymerized with the drying agent.

After 48 hrs. the obtained white polymer in both cases was ground, washed with $H_2O$ and dried. The weight of the polymer 5/1, 71.5 grams, 50.7% conversion
5/2, 126.76 grams, 89.9% conversion based upon the weight of the 2-pyrrolidone and its salt after $SO_2$ addition subjected to polymerization (141 grams). The obtained viscosity at room temperature (approx. 25° C.) was 5/1, 5.11 stokes
5/2, 7.52 stokes.

To further illustrate the criticality of anhydrous conditions to the polymerization the following work was carried out.

Example 6

Example 1 was repeated using 250 grams of the purified 2-pyrrolidone and 12.5 grams of analytical grade potassium hydroxide to produce a solution which, after the $CO_2$ treatment, weighed 215 grams and was divided into four substantially equal portions, A, B, C and D. No water was added to portion A. One drop of water (0.05 ml.) was added to portion B, two drops of water (0.10 ml.) were added to portion C, and three drops of water (0.15 ml.) were added to portion D. The four portions were placed in separate bottles without any drying agent, sealed and heated at $50\pm\frac{1}{2}°$ C. in a constant temperature oven for 48 hrs. Based upon the weight of the starting portions, portion A underwent a polymer conversion of only 54.6% and had a viscosity of 6.28 stokes, indicating that the solution mixture was not anhydrous after the $CO_2$ reaction; portion B underwent a polymer conversion of only 36.6% and had a viscosity of 5.06 stokes; portion C underwent a polymer conversion of only 2.1% and had a viscosity of 0.26 stoke; and portion D did not polymerize.

These results are in sharp contrast to the results obtained when water is excluded from the system and a drying agent is included to tie up any water formed during the reaction, in which event the polymer conversion is over 90% based upon the weight of the 2-pyrrolidone and its salt prior to $CO_2$, $NO_2$ or $SO_2$ treatment and the viscosity is at least 8 stokes and preferably as high as 12–14 stokes as measured at room temperature as a 5% solution in formic acid. The higher the viscosity the greater the molecular weight of the polymer.

Example 7

The following procedure is to illustrate an economically feasible high molecular weight polymer preparation.

300 grams of the pure, substantially hydrous 2-pyrrolidone were mixed with 15 grams of analytical grade potassium hydroxide. A vacuum of 40 microns and a nitrogen atmosphere was established and heat was applied whereby the potassium hydroxide dissolved at 63° C. and the vacuum dropped to 30 microns. Dehydration began at 83° C. and 104° C. distillation of 2-pyrrolidone began and the vacuum dropped to 20 microns. Heating was discontinued when the temperature reached 107° C. and the amount of distillate was 30.5 grams, equaling 9.7% of the weight of the mixture.

The solution mixture, weighing 284.5 grams, was cooled to 29° C. and bone dry $CO_2$ was bubbled through the solution. The solution mixture picked up 1.4 grams of $CO_2$ and its temperature increased to 40° C.

Next, 14 grams of potassium sulfate (about 5% based upon the weight of the $CO_2$ reaction mixture) were added to the mixture and the combination was sealed in a bottle and heated to 50±½° C. for 48 hrs. The white polymer weighed 298 grams, and was ground into chips and washed to neutral pH with water to remove the drying agent, potassium carbonate and the unreacted 2-pyrrolidone. The dried polymer chips weighed 277 grams, equaling a yield of 97.3% based upon the weight of the 2-pyrrolidone and its salt subjected to the $CO_2$ treatment. The viscosity of the polymer in solution at room temperature (approx. 25° C.), ½% solution in formic acid, was 12.9 stokes, evidencing high molecular weight.

The temperature increase which occurs during treatment with $CO_2$ or the other gases generally will not heat the solution mixture higher than about 48° C. In any case, the solution mixture should be cooled, if necessary, to maintain a suitable temperature as explained in Step 2.

Although an inert atmosphere, e.g. nitrogen, is generally used in the process as a precaution against undesirable side reactions, it has been determined that this is not essential when using substantially pure 2-pyrrolidone.

The polymers obtained by the claimed process have too high a viscosity to be measured in hexafluoroisopropanol. They can be extended and woven under the same conditions and using the same equipment as with nylon type polyamides. They can also be molded or solvent-coated in substantially the same manner as conventional nylon-type polyamides.

Variations and modifications may be made within the scope of the claims.

What is claimed is:

1. Process for the polymerization of substantially pure, substantially anhydrous 2-pyrrolidone which comprises the steps of:
    (a) mixing the 2-pyrrolidone with a substantially anhydrous alkaline reactant selected from the group consisting of alkali metals, alkali metal hydroxides and alkali metal bicarbonates in a mole ratio of from about 10:1 to 27:1;
    (b) heating said mixture under vacuum to a temperature of from 100° to 120° C. to react the alkaline reactant with the 2-pyrrolidone and form a mixture comprising 2-pyrrolidone and the alkali metal salt of 2-pyrrolidone and to distill off the water formed in the reaction mixture;
    (c) cooling the reaction mixture to room temperature;
    (d) bubbling a dry gas selected from the group consisting of carbon dioxide, nitrogen dioxide and sulfur dioxide through the previously cooled reaction mixture in an amount sufficient to react with substantially all of the metal in the 2-pyrrolidone salt;
    (e) mixing the mixture of step (d) with between about 1–5% by weight, based upon the weight of the reaction mixture, of an inert drying agent; and
    (f) heating to a temperature of from 48° C. to 52° C. for at least about 40 hours to produce a filament forming polymer.

2. Process according to claim 1 in which the alkaline reactant is potassium hydroxide.

3. Process according to claim 1 in which the drying agent is selected from the group consisting of alkali metal sulfates, carbonates and bicarbonates.

4. Process according to claim 1 in which the final polymer is washed in water to remove the drying agent and alkali metal salt formed by the reaction of the alkali metal ions and the gas.

5. Process according to claim 1 in which the dry gas is carbon dioxide.

6. Process according to claim 1 in which the distillation of water in step (b) is accompanied by the distillation of up to about 10% of the weight of the 2-pyrrolidone in order to insure anhydrous conditions.

7. Process according to claim 1 in which the temperature in step (f) is maintained at 50±½° C.

8. Process according to claim 1 in which the mole ratio in step (a) is 13:1.

9. Process according to claim 1 in which the dry gas is nitrogen dioxide.

10. Process according to claim 1 in which the dry gas is sulfur dioxide.

11. Process according to claim 1 in which the alkaline reactant is potassium hydroxide, the mole ratio in step (a) is 13:1, and the dry gas is carbon dioxide, the temperature in step (f) is 50±½° C. and the reaction time in step (f) is 48 hours.

12. Process according to claim 11 in which the drying agent is an alkaline metal sulfate.

References Cited

UNITED STATES PATENTS

| | | | |
|---|---|---|---|
| 3,681,293 | 8/1972 | Jarovitzky et al. | 260—78 P |
| 3,682,869 | 8/1972 | Jarovitzky | 260—78 P |
| 3,683,046 | 8/1972 | Jarovitzky | 260—78 P |
| 3,721,652 | 3/1973 | Barnes | 260—78 P |
| 3,017,391 | 1/1962 | Mohus et al. | 260—78 L |

OTHER REFERENCES

Noble: The Study of the Polymerization of α-Pyrrolidone, Doctoral Thesis, 1956, University of Colorado.

HAROLD D. ANDERSON, Primary Examiner